Figure 1:
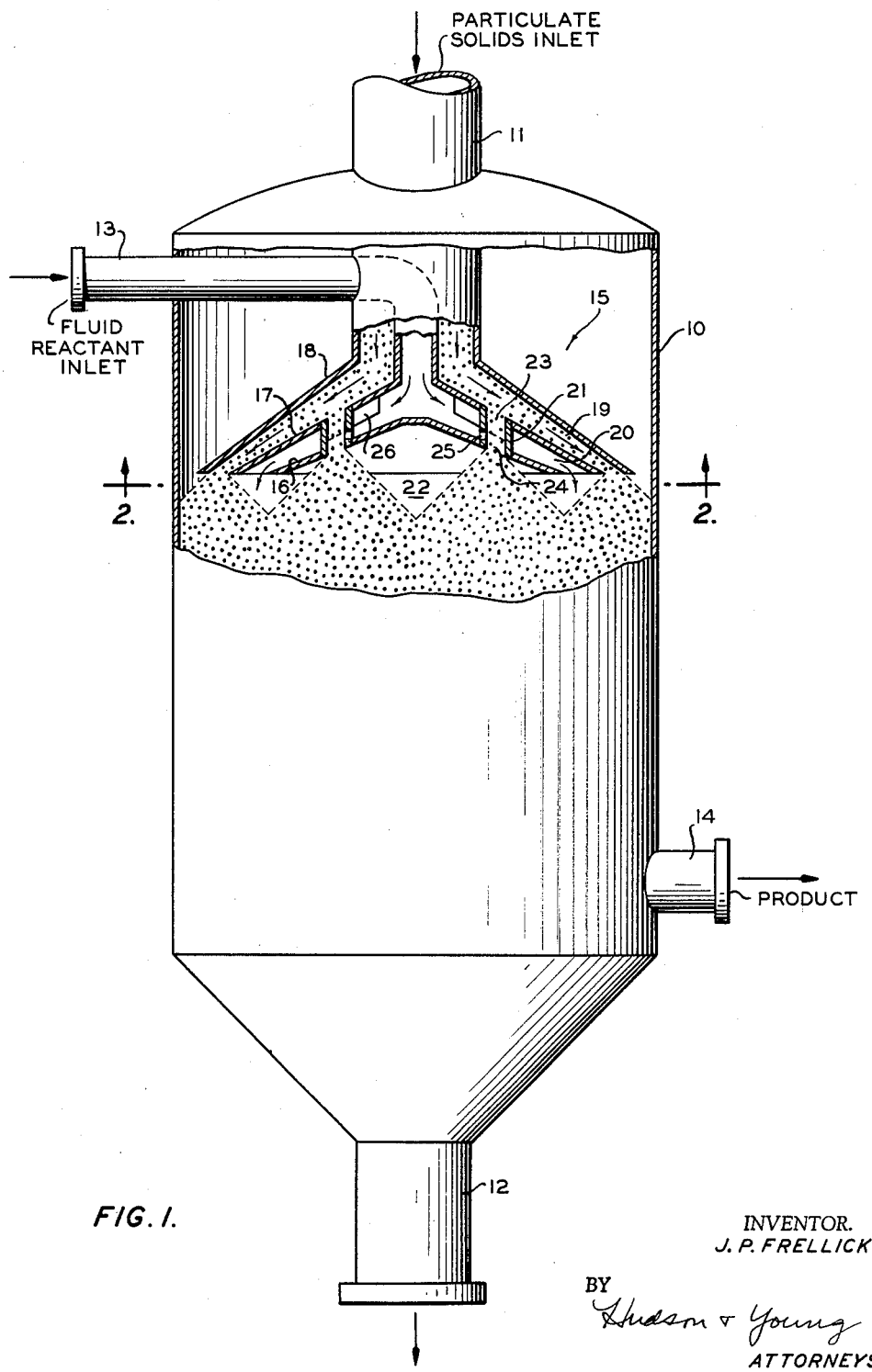

Dec. 15, 1959 J. P. FRELLICK 2,917,455
FEED DISTRIBUTOR FOR FLUID REACTANTS
AND PARTICULATE SOLIDS

Filed May 10, 1957 2 Sheets-Sheet 1

INVENTOR.
J. P. FRELLICK

BY Hudson & Young
ATTORNEYS

Dec. 15, 1959  J. P. FRELLICK  2,917,455
FEED DISTRIBUTOR FOR FLUID REACTANTS
AND PARTICULATE SOLIDS
Filed May 10, 1957  2 Sheets-Sheet 2

INVENTOR.
J. P. FRELLICK
BY
ATTORNEYS

United States Patent Office 2,917,455
Patented Dec. 15, 1959

2,917,455

FEED DISTRIBUTOR FOR FLUID REACTANTS AND PARTICULATE SOLIDS

Jacob P. Frellick, Woods Cross, Utah, assignor to Phillips Petroleum Company, a corporation of Delaware Application May 10, 1957, Serial No. 658,397

13 Claims. (Cl. 208—166)

This invention relates to a method and apparatus for contacting solid particulate material with a fluid. In one of its aspects, this invention relates to a method and apparatus for feeding fluid reactants and solid particulate material into a moving bed of said solid particulate material. In another of its aspects, this invention relates to a method and apparatus for the utilization of a contiguous moving mass of particulate solids in the thermal and/or catalytic treatment of hydrocarbons.

In many petroleum processes, a feed stream is contacted with a solid particulate material in an enclosed vessel for the purpose of effecting thermal and/or catalytic treatment of the feed stream. Usually the vessel is arranged in a vertical manner with the solid particulate material supplied to the top portion thereof at an elevated temperature and removed at the bottom of said vessel so that a downwardly moving mass of particulate solid material is developed within the vessel. The feed stream, which is usually at least partly in the liquid phase, is also introduced into the upper portion of the enclosed vessel. It is important that the introduction of the feed stream into the vessel be made in such a manner that the feed stream is uniformly distributed throughout the solid particulate material across the horizontal cross-sectional area of the vessel in order not to impair the efficiency of the thermal and/or catalytic process conducted within the vessel. If a disproportionately large amount of the feed stream reaches only a relatively small portion of the hot particulate solids mass, a relatively large amount of the feed stream passes through only a small portion of the mass and a considerable portion of the solid particulate material passes through the vessel without being utilized. Furthermore, the non-uniform contacting of the feed stream with the solid particulate material causes coky deposits to be formed on some of the solid particles, which reduces the efficiency of the conversion to a level not economically feasible and results in an agglomeration of coky deposits which clog up the system and require shut down for an extended period for their removal. Also, non-uniform distribution of the feed stream makes it difficult to prevent channeling from developing in the bed of solid particulate material so that an even flow of fluid reactant and solid particulate material through the vessel cannot be maintained.

It is an object of this invention to provide a novel method and apparatus for contacting solids and fluids. Another object of this invention is to provide a method and apparatus for feeding fluids and solid particulate material into moving masses of said solid particulate material. Another object of this invention is to provide a method and apparatus for feeding fluids, especially hydrocarbon vapors, into downwardly moving masses of particulate material which may or may not exhibit catalytic properties. Another object of this invention is to provide a method and apparatus for uniformly distributing a fluid and solid particulate material across the horizontal cross-sectional area of a downwardly moving mass of said solid particulate material, without either excessive deposition of coke or undesirable reactions taking place. Another object of this invention is to provide a method and apparatus for utilizing a contiguous moving mass of solid particulate material in the conversion of hydrocarbon stocks.

Other aspects, objects and the advantages of the invention are apparent from a consideration of the accompanying description, the drawing, and the appended claims.

According to the present invention, there is provided a method and apparatus for contacting fluids with solid particulate material in such a manner that an extensive surface of said solid particulate material is exposed for contact with said fluid in a plurality of concentric tubular discharge streams of solid particulate material and fluid. More specifically, in accordance with the present invention, there is provided a method for feeding a fluid reactant and solid particulate material into a downwardly moving bed of said solid particulate material which comprises feeding said fluid reactant and said solid particulate material into a distribution zone located substantially axially in said bed, said distribution zone being adapted to provide a continuous peripheral tubular flow discharge stream of solid particulate material and fluid reactant with at least one central discontinuous tubular flow discharge stream of solid particulate material and fluid reactant, whereby said fluid reactant and said solid particulate material are uniformly distributed across the horizontal cross-sectional area of said downwardly moving bed. In one specific embodiment of the invention, at least one of said central discontinuous tubular flow discharge streams of said solid particulate material and said fluid reactant is composed of alternate fluid reactant-rich and solid particulate material-rich zones circumferentially arranged in said tubular stream.

Also, according to the invention, there is provided an apparatus for contacting a fluid reactant with a downwardly moving bed of solid particulate material within a vessel which comprises a circular distribution means axially disposed within said vessel, an inlet means for supplying solid particulate material to said distribution means, inlet means for supplying fluid reactant to said distribution means, said distribution means having a continuous peripheral feeding zone in open communication with said solid particulate material inlet means and said fluid reactant inlet means, and said distribution means having a plurality of spaced centrally located feeding zones in open communication with said solid particulate material inlet means and said fluid reactant inlet means circumferentially arranged on at least one locus of points equi-distant from the center line of said circular distribution means. More specifically, there is provided a solids-fluid feeder-distributor apparatus comprising a first conical baffle extending downwardly and outwardly towards the walls of an enclosed vessel, a second conical baffle extending downwardly and outwardly and located above said first conical baffle with the apexes of said first and said second conical baffles in vertical alignment thereby forming a first passageway between said first conical baffle and said second conical baffle, and an outwardly flared skirt located above said second conical baffle forming a second passageway between said second conical baffle and said skirt. The passageway between the outwardly flared skirt and the second conical baffle is in open communication with a solid particulate material inlet means with said inlet means arranged for the solid particulate material to enter the passageway along the vertical axis of the assembly of the first and second conical baffles and the outwardly flared skirt. The passageway between the second conical baffle and the first conical baffle is in open communication with a fluid reactant inlet means arranged for the fluid reactant to enter the passageway at a point directly above the apex of the first conical baffle in order that balanced flow of fluid reactant over the upper surface of the first conical baffle is obtained. The passageways between the first and second conical baffles and between the second conical baffle and the outwardly flared skirt are in open communication with the space within the enclosed vessel. A series of tubes are vertically disposed between the first and second conical baffles in openings in the surfaces of said first and second conical baffles so that the passageway between the first and second conical baffles is in further open communication with the space within the vessel. These vertical tubes are arranged circumferentially in a single or plurality of rows at spaced distances apart so that each tube in each circular row is equi-distant from the apexes of the baffles.

In one embodiment of the invention, an opening is provided in the vertical wall of each tube in order to provide for the flow of fluid reactant from the passageway between the first and second conical baffles into the vertical tubes and then into the open space within the vessel. These openings are located in the wall of the vertical tube closest to the vertical center line passing through the apexes of the conical baffles. In order to assure balanced flow of fluid reactant in the passageway between the first and second baffle past the vertical tubes, flow-directing tubes may be radially arranged between said vertical tubes preferably with the inlet ends of said flow-directing tubes located at a point intermediate between the vertical center line through the apexes of the conical baffles and the walls of the vertical tubes closest to said vertical center line.

In another embodiment, openings are provided in the surface of the first conical baffle between the vertical tubes thereby providing for a path of flow of fluid reactant from between the first and second conical baffles directly into open space within the vessel. In this embodiment, there are no openings in the walls of the vertical tubes located in the passageway between the first and second conical baffles. Radial flow-directing tubes are located between the vertical tubes in the passageway between the first and second conical baffles adjacent the surface of the second conical baffle. Closures are provided in each area bounded by adjacent vertical tubes, the upper surface of the first conical baffle and the lower wall of the flow-directing tube so that fluid reactant flowing in the passage between the two conical baffles must either flow through the flow-directing tube or through the opening in the first conical baffle.

Figure 2:
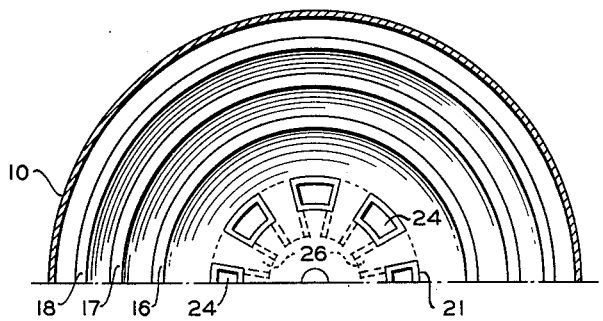
Figure 3:
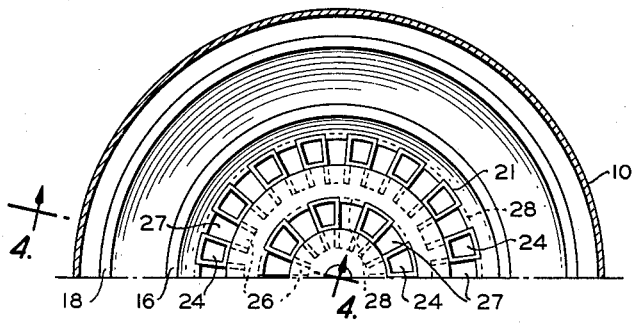
Figure 4:
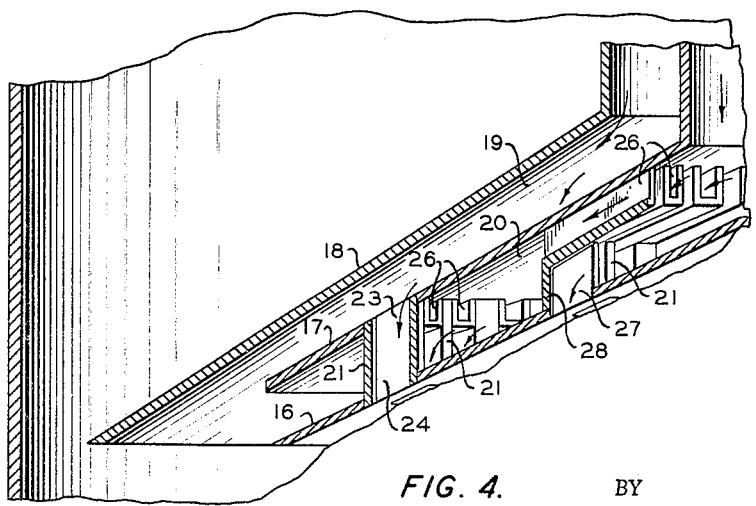

For a better understanding of the invention, reference is now made to the accompanying diagrammatic drawings. Figure 1 is an elevational view, partially in section, showing a preferred form of the invention. Figure 2 is a sectional view taken along line 2—2 of Figure 1. Figure 3 is a partial plan view of another embodiment of the invention from underneath the lower conical baffle. Figure 4 is a partial sectional view taken along line 4—4 of Figure 3.

Referring now to the drawings, Figure 1 shows an upright vessel in which a solid particulate mass is maintained as a downwardly moving bed. A particulate solids inlet pipe 11 is centrally located at the top of vessel 10 and a particulate solids outlet pipe 12 is provided at the lower end of vessel 10. A conventional vapor-solids disengaging section, not shown in the drawing, is located in the lower portion of vessel 10. A fluid reactant inlet pipe 13 is located in the upper portion of vessel 10 and a product outlet pipe 14 is located in the lower portion of vessel 10.

The feed-distributor assembly 15 comprises conical baffle 16, conical baffle 17 and outwardly flared skirt 18. Outwardly flared skirt 18 is attached to the end of particulate solids inlet pipe 11 at its open end terminating in the upper portion of vessel 10. Conical baffle 17 is located below outwardly flared skirt 18 with its apex on the center line of pipe 11 at a distance which provides passageway 19 between outwardly flared skirt 18 and baffle 17. Conical baffle 16 is located below conical baffle 17 in vertical alignment with baffle 17 and outwardly flared skirt 18 at a distance which provides for passageway 20 between conical baffle 17 and conical baffle 16. As shown in Figure 1, the outer edges of baffles 16 and 17 and outwardly flared skirt 18 terminate in the same horizontal plane with conical baffle 17 having a larger base angle than conical baffle 16 and outwardly flared skirt 18 having a larger base angle than conical baffle 17. The end of fluid reactant inlet pipe 13 is arranged concentrically with the end portion of particulate solids inlet pipe 11 and terminates at the apex of conical baffle 17 in an opening which provides open communication between fluid inlet pipe 13 and passageway 20. A plurality of vertical particulate solids tubes are circumferentially arranged in passageway 20 and connect passageway 19 in open communication with open space 22 in the upper portion of vessel 10 through openings 23 in conical baffle 17 and openings 24 in conical baffle 16. Particulate solids inlet tubes 21 are preferably rectangular in cross-sectional area, as is shown in Figure 2; however, tubes of circular cross-section may also be used. If desired, several rows of vertical particulate solids inlet tubes 21 may be used as is shown in the embodiment in Figures 3 and 4. The circumferential arrangement of tubes 21 is shown in Figure 2 of the drawings. Openings 25 are provided in each wall of vertical particulate solids inlet tube 21 nearest the vertical center line of the feeder-distributor assembly. Openings 25 are shown as slots in the embodiment of Figures 1 and 2; however, openings of circular configuration may also be used and are located either flush with the top surface of conical baffle 16 or at some distance therefrom. As shown in the embodiment in Figures 1 and 2, flowing-directing tubes 26 are located in passage 20 between vertical particulate solids inlet tubes 21 with the inlet ends of flow-directing tubes 26 located a substantial distance from the outer wall of vertical tubes 21.

In the operation of the embodiment shown in Figures 1 and 2, particulate solids enter through pipe 11 and flow downwardly until they impinge on conical baffle 17 and are deflected downwardly and outwardly through passageway 19 into space 22 within vessel 10. A portion of the particulate solids flow directly from passageway 19 through vertical tubes 21 in a downward direction into the central portion of vessel 10. Fluid reactant enters vessel 10 by way of pipe 13 and flows downwardly until it impinges upon conical baffle 16 and is diverted into passageway 20. A portion of the fluid reactant flows through opening 25 in vertical tubes 21 and contacts downwardly moving particulate solids in tubes 21 before being discharged into the central portion of vessel 10 along with the particulate solids passing through tubes 21. The remaining portion of the fluid reactant flowing in passageway 20 flows through flow-directing tubes 26 and is ejected outwardly and downwardly in a peripheral manner from passageway 20 into contact with particulate solids being ejected from passageway 19. Thus, a substantial proportion of the particulate solids fed into vessel 10 is exposed to contact with fluid reactant to provide a continuous peripheral discharge of particulate solids and fluid reactant near the outer edge of the downwardly moving bed of solid particulate material as well as a discontinuous tubular discharge of intermixed particulate solids and fluid reactant within the central portion of the downwardly moving bed. It will be noted that the particulate solids and fluid reactant ejected peripherally through passageways 19 and 20 are not contacted with each other until after leaving the feeder-distributor assembly; however, the particulate solids and fluid reactant ejected into the central portion of the vessel through vertical tubes 21 are intimately contacted within vertical tube 21 before being discharged from the feeder-distributor assembly. By using this feeder-distributor assembly to more evenly distribute the fluid reactant over and throughout the particulate solids, there is no area or contact section where the particulate solid to fluid reactant ratio is too high, which would undesirably result in the production of too much coke and light products, and there is no area or contact section where the particulate solids to fluid reactant ratio is too low, which would undesirably result in less conversion of the fluid reactant charged.

Another embodiment of the invention is shown in Figures 3 and 4, wherein there is shown only a portion of the feeder-distributor assembly. In this embodiment, two concentric circular rows of vertical particulate solids tubes 21 are positioned in passageway 20 between conical baffles 16 and 17 and the fluid reactant is ejected directly into the central portion of the vessel 10 at points located between tubes 21 instead of being directed through openings into tubes 21 to contact the particulate solids passing therethrough. As shown in Figure 3, which is a plan view of baffle 16 viewed from underneath, openings 27 are provided in conical baffle 16 between each adjacent vertical particulate solids tube 21 to provide open communication between passageway 20 and the open space within vessel 10. Closure members 28 are located in passageway 20 between each pair of particulate solids tubes 21 and adjacent to openings 27 in order to prevent flow of fluid reactant in passageway 20 past openings 27 so that all flow of fluid reactant in passageway 20 is through flow-directing tubes 26. If desired, flow-directing tubes 26 need not be used in this construction and closure members 28 may be provided with an opening therethrough and extended to the lower surface of conical baffle 17; however, more balanced flow of fluid reactant in passageway 20 is obtained with the use of flow-directing tubes 26.

Another feature of this embodiment is the use of conical baffles having the same diameter so that the peripheral edges of these baffles terminate in the same vertical plane, as shown in Figure 4, instead of in the same horizontal plane, as shown in Figure 1. Thus, as shown in Figure 4, the peripheral edges of outwardly flared skirt 18 and conical baffle 16 terminate in the same horizontal plane but the peripheral edges of conical baffle 17 and conical baffle 16 terminate in the same vertical plane. This construction provides for more direct flow of fluid reactant from passageway 20 into the stream of particulate solids ejected through passageway 19, and, therefore, more intimate contact between the particulate solids and the fluid reactant.

In the operation of the embodiment shown in Figures 3 and 4, the flow of particulate solids in passageway 19 and vertical tubes 21 is the same as that described with reference to the embodiment shown in Figures 1 and 2. However, in this embodiment, fluid reactant is not directed into contact with particulate solids within tubes 21 but is discharged directly into the central portion of the vessel 10 as a separate stream. Thus, the circular discharge of particulate solids and fluid reactant into the central portion of vessel 10, immediately upon discharge from the feeder-distributor assembly, comprises alternate circumferentially arranged streams of fluid reactant and particulate solids.

The feed distributor apparatus of this invention may be used in any process wherein it is desirable to secure uniform distribution of a fluid reactant throughout solid particulate contact material. The apparatus of this invention is particularly useful in petroleum processes wherein a petroleum stream is either to be heated to an elevated temperature by contact with a solid heat exchange material at an elevated temperature or a petroleum stream is to be converted into other products by either thermal or catalytic action. A thermal or catalytic cracking operation may be carried out in a very effective manner utilizing the feeder-distributor apparatus of this invention. Other operations, such as desulfurization, hydrogenation, dehydrogenation, and reforming may be carried out using this feeder-distributor apparatus.

The feeder-distributor apparatus of this invention may be employed with many different types and sizes of particulate solids materials depending upon whether a purely thermal or a thermal-catalytic type operation is being performed. If the apparatus is being used in a pebble heater type heat exchanger the particulate solids material will consist of pebbles which are ordinarily substantially spherical in shape and range in size from about ⅛ inch to about 1 inch in diameter. These pebbles must be capable of withstanding not only rapid temperature changes but also high temperatures and materials such as metal alloys, silicon carbide, alumina, periclase, beryllia, Stellite, zirconia, and mullite are used. If the feeder-distributor apparatus of this invention is employed in a hydrocarbon conversion process, the particulate solids material may have a particle size as small as 3–100 mesh or may have a diameter up to about ¾ inch. Particulate solids contact material which is catalytic in nature may be either natural or treated clays, bauxite, activated alumina, or synthetic composites of silica, alumina, or silica and alumina, to which certain metallic oxides may have been added in small amounts. An acid-treated Halloysite base natural catalyst ($Al_2O_3.2SiO_2.H_2O$), having a particle size in the range of 4–10 Tyler mesh, can be very efficiently used in the feeder-distributor apparatus of this invention.

It will be noted that the feeder-distributor apparatus of this invention can efficiently handle a fluid reactant which is either in the liquid phase, the vapor phase, or in a mixed phase comprising both liquid and vapor phases. Ordinarily, the fluid reactant will be in vapor phase and will probably contain some liquid phase varying in proportion from a small amount to a substantial amount. However, a liquid hydrocarbon material such as a residual stock, a topped stock, or a reduced crude can also be handled by the feeder-distributor apparatus of this invention.

During operation of the feeder-distributor apparatus of this invention in a catalytic cracking process, a virgin gas oil having an API gravity (60° F./60° F.) of 33° is fed to a catalytic chamber at a temperature of about 725° F. in mixed vapor and liquid form. The catalytic chamber contains a downwardly moving bed of acid-treated Halloysite base natural catalyst ($Al_2O_3.2SiO_2.H_2O$) ranging in particle size from 4–10 Tyler mesh. The gas oil reactant is maintained within the catalytic chamber for a residence time of 19 seconds and is discharged at a temperature of about 910° F. Using the feeder-distributor apparatus shown in Figures 1 and 2 to evenly distribute the gas oil reactant over and throughout the catalyst, it is observed, on the basis of product analysis, that the gas oil reactant and catalyst are uniformly distributed across the reactor cross-section. That is, there is no area where the catalyst to hydrocarbon ratio is too high, resulting in the production of large quantities of coke and light products, and, also, there is no area where the catalyst to hydrocarbon ratio is too low, resulting in less conversion of the gas oil reactant. Also, taking into account the endothermic nature of the cracking reaction which is effected, measurements of temperatures taken across the catalyst bed during the operation show substantially the same temperature level throughout the cross-section of the moving bed.

Reasonable variation and modification are possible within the scope of the foregoing disclosure, drawing and the appended claims to the invention, the essence of which is that there have been provided a method and apparatus for uniformly and evenly feeding and distributing into a downwardly moving bed of solid particulate material a fluid reactant and solid particulate material, the method comprising feeding said fluid reactant and said solid particulate material into an axially disposed distributing zone adapted to provide a continuous peripheral tubular flow discharge stream of intermixed solid particulate contact material and fluid reactant and at least one centrally located discontinuous tubular flow discharge stream of solid particulate material and fluid reactant, whereby said solid particulate material and fluid reactant are uniformly distributed across the horizontal cross-sectional area of said downwardly moving bed of solid particulate material; the apparatus comprising a feeder-distributor assembly in open communication with the interior of a solid particulate material containing vessel in which it is contained, inlet means for supplying solid particulate material to said feeder-distributor assembly, inlet means for supplying fluid reactant to said feeder-distributor assembly, said feeder-distributor assembly having a peripheral feeding zone in open communication with said solid particulate contact material inlet means and said fluid reactant inlet means, said feeder-distributor assembly having a plurality of centrally located spaced feeding zones in open communication with said solid particulate contact material inlet means and said fluid reactant inlet means, and said centrally located spaced feeding zones circumferentially arranged in concentric rows around the central vertical axis of said feeder-distributor.

I claim:

1. A method for feeding fluid and particulate solids into a downwardly moving bed of said particulate solids comprising feeding said fluid and said particulate solids into a distribution zone located substantially axially in said bed, said distribution zone being adapted to provide a continuous peripheral tubular flow discharge stream of particulate solids and fluid with at least one centrally located tubular flow discharge stream of particulate solids and fluid, said centrally located discharge stream comprising a plurality of circumferentially arranged flow streams, whereby said fluid and said particulate solids are uniformly distributed across the horizontal cross-sectional area of said downwardly moving bed of said particulate solids.

2. A method according to claim 1 wherein at least one of said centrally located tubular flow discharge streams of particulate solids and fluid is composed of alternate fluid-rich and particulate solids-rich zones circumferentially arranged in circular configuration to form said tubular stream.

3. A method according to claim 1 wherein said fluid is a mixture of liquid and vapor phases.

4. A method for feeding fluid and particulate solids into a downwardly moving bed of said particulate solids comprising feeding said fluid and said particulate solids into a distribution zone located substantially axially in said bed, from said feed distribution zone feeding a first portion of said particulate solids and said fluid into a peripherally disposed continuous feeding zone, from said distribution zone feeding a second portion of said particulate solids and said fluid into centrally located downward feeding zone, said centrally located downward feeding zone having a plurality of spaced discharge ports in circular arrangement for passage of said particulate solids and said fluid therethrough.

5. A method for feeding fluid and particulate solids into a downwardly moving bed of said particulate solids comprising feeding said fluid and said particulate solids into a distribution zone located substantially axially in said bed, from said distribution zone feeding a first portion of said particulate solids and said fluid into a peripherally disposed continuous feeding zone, from said distribution zone feeding a second portion of said particulate solids into a centrally located downward feeding zone comprising a plurality of separate streams circumferentially arranged along a locus of points equi-distant from the center of said distribution zone, from said distribution zone feeding a second portion of said fluid into said centrally located downward feeding zone as a plurality of separate streams circumferentially arranged along a locus of points equi-distant from the center of said distribution zone.

6. A method according to claim 5 wherein said particulate solids and said fluid are discharge from a plurality of separate streams alternately arranged circumferentially along a locus of points equi-distant from the center of said distribution zone.

7. An apparatus for feeding fluid and particulate solids into a vessel containing a downwardly moving bed of particulate solids comprising a first axially disposed conical baffle extending downwardly and outwardly toward the walls of said vessel, a second axially disposed conical baffle extending downwardly and outwardly toward the walls of said vessel located above said first conical baffle at a distance forming a first passageway between said first and said second conical baffles, an outwardly flared skirt located above said second conical baffle at a distance forming a second passageway between said second conical baffle and said skirt, a plurality of vertically disposed tubes located between said first and said second conical baffles axially arranged and providing open communciation between said second passageway and the space below said first conical baffle, said vertically disposed tubes having an opening in one wall providing open communication between said first passageway and the space below said first conical baffle, a fluid inlet means in open communication with said first passageway, and a particulate solids inlet means in open communication with said second passageway.

8. An apparatus according to claim 7 wherein said second control baffle has a base angle with the horizontal greater than the base angle with the horizontal of said first conical baffle and said outwardly flared skirt has a base angle with the horizontal greater than the base angle with the horizontal of said second conical baffle.

9. An apparatus according to claim 8 wherein the peripheral edges of said first conical baffle, said second conical baffle and said outwardly flared skirt terminate substantially in the same horizontal plane.

10. An apparatus according to claim 8 wherein the peripheral edges of said first conical baffle and said outwardly flared skirt terminate substantially in the same horizontal plane and the peripheral edges of said second conical baffle and said first conical baffle terminate substantially in the same vertical plane.

11. An apparatus according to claim 7 wherein radial flow-directing tubes are disposed in said first passageway between said adjacent vertically disposed tubes.

12. An apparatus for feeding fluid and particulate solids into a vessel containing a downwardly moving bed of particulate solids comprising a first axially disposed conical baffle extending downwardly and outwardly toward the walls of said vessel, a second axially disposed conical baffle extending downwardly and outwardly toward the walls of said vessel located above said first conical baffle at a distance forming a first passageway between said first and said second conical baffle, an outwardly flared skirt located above said second conical baffle at a distance forming a second passageway between said second conical baffle and said skirt, a plurality of vertically disposed tubes located between said first and said second conical baffles axially arranged and providing open communication between said second passageway and the space below said first conical baffle, said first conical baffle having a plurality of openings, circumferentially arranged between said adjacent vertically disposed tubes located in said first passageway, said opening providing open communication between said first passageway and the space below said first conical baffle, a plurality of closure members located in said first passageway between said vertically disposed tubes and between said first and said second conical baffles downstream from said plurality of openings in said first conical baffle, each of said pluralities of closure members having an opening therethrough, a fluid inlet means in open communication with said first passageway and a particulate solids inlet means in open communication with said second passageway.

13. An apparatus for feeding fluid and particulate solids into a vessel containing a downwardly moving bed of particulate solids comprising a first axially disposed conical baffle extending downwardly and outwardly toward the walls of said vessel, a second axially disposed conical baffle extending downwardly and outwardly toward the walls of said vessel located above said first conical baffle at a distance forming a first passageway between said first and said second conical baffles, an outwardly flared skirt located above said second conical baffle at a distance forming a second passageway between said second conical baffle and said skirt, a plurality of vertically disposed tubes located between said first and said second conical baffles axially arranged and providing open communication between said second passageway and the space below said first conical baffle, said first conical baffle having a plurality of openings circumferentially arranged between said adjacent vertically disposed tubes located in said first passageway providing open communication between said first passageway and the space below said first conical baffle, a plurality of radially disposed flow-directing tubes located between adjacent vertically disposed tubes in said first passageway, a plurality of closure members located in said first passageway between said adjacent vertically disposed tubes and between said radially disposed flow-directing tubes and said first conical baffle, a fluid inlet means in open communication with said first passageway, and a particulate solids inlet means in open communication with said second passageway.

References Cited in the file of this patent

UNITED STATES PATENTS

| | | |
|---|---|---|
| 2,493,035 | Savage | Jan. 3, 1950 |
| 2,789,889 | Bergstrom et al. | Apr. 23, 1957 |

UNITED STATES PATENT OFFICE

CERTIFICATE OF CORRECTION

Patent No. 2,917,455 December 15, 1959

Jacob P. Frellick

It is hereby certified that error appears in the printed specification of the above numbered patent requiring correction and that the said Letters Patent should read as corrected below.

Column 8, line 33, for "control" read -- conical --; line 69, for "opening" read -- openings --.

Signed and sealed this 26th day of July 1960.

(SEAL)
Attest:

KARL H. AXLINE
Attesting Officer

ROBERT C. WATSON
Commissioner of Patents